United States Patent Office 3,240,581
Patented Mar. 15, 1966

3,240,581
PROCESS FOR TREATING GLASS FURNACE
Thomas B. O'Connell and Delmar E. Carney, Toledo, Donald E. Shamp, Millbury, and Clarence A. Gartz, Jr., Toledo, Ohio, assignors to Libbey-Owens-Ford Glass Company, Toledo, Ohio, a corporation of Ohio
No Drawing. Filed Sept. 12, 1961, Ser. No. 137,520
13 Claims. (Cl. 65—27)

This invention relates to a process for producing glass of improved quality. More particularly, the invention relates to a process for reducing defects in glass originating from loosely adherent crystals on the siliceous refractory in a glass melting furnace.

In the production of glass, such as sheet or plate glass, glass, which is conventionally of a soda-lime-silica type, it has been observed that a porous crystalline scale forms on the surface of the silica refractory walls of a glass furnace above the melt and particularly on the refractory roof of the furnace. This phenomenon is believed to result from the gradual attack of the silica by alkali and sulfate vapors from the glass itself and from the batch from which the glass is made. These vapors react with the silica in the refractory to form a silica rich glassy phase which partially recrystallizes into a siliceous scale. Analysis of this scale reveals that it contains a polymorphic mixture of tridymite and cristobalite crystals together with a glassy matrix.

It has also been observed that after a prolonged period of time, during which it is believed that the alkali and sulfate vapor attack continues, the scale is ultimately destroyed resulting in the formation of a dense glassy coating on the refractory. When the alkali attack on the refractory is rapid, this scale is quickly converted to the dense glassy coating covering the refractory. When the alkali attack is gradual, however, the scale continues to build upon the refractory and under certain conditions, the exact nature of which is not understood, it has been observed that the rate of formation of the glassy phase is greater than the rate of re-crystallization whereby the glassy matrix increases producing a tacky form of scale which is loosely adherent to the refractory surface.

The formation of the siliceous scale and especially the formation of the tacky form of the scale has been observed to occur principally at glass refining conditions. Specifically, this phenomenon has been observed in furnaces with a substantially pure silica refractory operating at refining temperatures in the range of about 2000 to 2500° F. in the presence of soda-lime-silica glass. In a continuous melting and refining furnace of the type in which a batch mixture is introduced at one end of the furnace, is reduced to a molten state in a melting tank or chamber from which it flows into a glass conditioning section and is thereafter removed from the latter section as a homogeneous molten material, the siliceous scale is primarily to be found on the refractory in the conditioning section of the furnace. No heat is applied directly to the molten glass in the conditioning section of the furnace but rather the glass is merely retained in this section while its temperature is reduced in a controlled manner and until the molten bath is in a desirable condition for removal from the furnace. While this is the primary function of this section of the furnace, it is commonly referred to in the art, and will be so identified herein, as the refining section or chamber of the furnace.

During the glass making process, the relatively loosely adherent siliceous scale spalls or flakes off of the surface of the silica refractory and drops into the molten bath of glass. Since the cristobalite or tridymite crystals are not readily soluble in molten glass, they are carried into the glass sheet or other article formed from the melt and appear therein as small, translucent white crystalline inclusions commonly known as "stones." These "stones" or contaminations are readily noticeable and ruin the glass as regards acceptable commercial quality.

Accordingly, it is a primary object of the present invention to provide a process of reducing the formation of loosely adherent crystals on the silica refractory of a glass melting furnace thereby enabling the production of glass which is free of defects caused by crystalline contaminations or "stones."

Another object of the invention is to accomplish the foregoing by transforming the loosely adherent crystals into a glasseous coating on the inner surface of the silica refractory of a glass melting furnace.

Still another object is to transform the crystals by introducing a fluxing agent into the furnace atmosphere while the furnace is in operation.

The invention also resides in the utilization of a fluxing agent which not only dissolves and transforms the loosely adherent crystals but also maintains a controlled atmosphere in the furnace.

Experience has indicated that the formation of the siliceous scale often occurs more or less in scattered patches on the refractory and that its formation, at least in a critical sense as regards glass defects, commences after the furnace has been in operation for a period of time. Quite often furnaces are over a year old when the defect is first noticed although the defect has been observed in furnaces in operation only eight months and on the other hand in some furnaces and under some conditions, the stones never appear. Since the exact cause of the scale formation is not fully understood, it is difficult to anticipate with any certainty if, where or when the scale will appear or whether when it appears it will contaminate the molten glass thus giving rise to the glass defects.

In accordance with the present invention, when the scale forms in a glass furnace, the roof and walls of the furnace are treated by a simple and inexpensive process which completely dissolves the scale and rapidly transforms it into the desired dense glassy coating covering the refractory and preventing further alkali attack on the refractory. This process of treating the refractory may be performed anytime after the scale first appears and since the treatment has no adverse effects on the glass melt, it may be performed while the furnace is in operation thereby eliminating the need for costly shutdowns and so called "cold repairs."

Generally stated, the present process comprises introducing a fluxing agent into the furnace atmosphere and into contact with the refractory roof and walls. The agent is introduced into the furnace from an outside source through openings in the walls and is directed against those portions of the walls and roof having a scale formation thereon. The operation is continued until all of the scale has been transformed into the glassy coating.

It has been found that solution of the siliceous scale may be accomplished efficiently by the utilization of fluxing agents comprising compounds containing both sodium and sulfur. An additional benefit of using such a fluxing agent is that both of these substances are components of the glass batch and, therefore, no foreign contamination is added to the glass melt. The exact nature of the reaction which takes place between the scale and the fluxing compound is not fully understood but it is believed that the compounds are chemically decomposed in the furnace and ultimately produce sodium oxide which dissolves the scale to form a sodium silicate glass coating on the roof and walls of the furnace.

The source of the sodium-sulfur fluxing agent may comprise various organic or inorganic compounds. For example, an inorganic compound such as sodium sulfate, commonly known as salt cake, may be utilized, which compound when thermally and chemically decomposed in the furnace produces the more active intermediate sodium-sulfur compounds and ultimately sodium oxide which reacts with the scale to produce the glasseous coating. The chemical decomposition of sodium sulfate is accomplished by artifically maintaining a reducing atmosphere within the furnace during the spraying operation whereby the sodium sulfate is reduced to sodium sulfite and sodium sulfide and ultimately sodium oxide while in contact with the scale whereupon it has been observed that a vigorous action takes place with the formation of sodium silicate glass in and on the internal furnace walls. As noted above, this sodium silicate glass, in its first stages, acts as a glue to prevent the scale from falling from the roof and walls of the furnace and, in addition, after a short period of time, forms a dense glazed coating on the refractory protecting it from further alkali and sulfate fume attack.

The problem of glass contamination, as set forth above, is linked primarily with scale formed on the refractory in the refining section of the furnace. It has long been accepted that maintaining a reducing atmosphere in the refining tank of a furnace has a determental effect on the glass produced since the molten glass is reduced resulting in a particular defect or contamination in the glass commonly referred to as "seeds." However, we have discovered that under properly controlled conditions, a reducing atmosphere may be created and maintained in the refining end of the furnace.

The reducing atmosphere may be achieved satisfactorily through the use of any reducing gas or source of reducing gas such as carbon monoxide, hydrogen, sulfur dioxide, and dissociated ammonium, hydrocarbons and other organic compounds, which gases or source of gases are introduced into the refining section of a glass furnace in a controlled manner whereby the atmosphere is reducing in nature, particularly adjacent the refractory to be treated but is controlled within limits so as not to reduce the glass melt.

If desired, the inorganic sodium-sulfur compound which constitutes the source of the flux may be mixed in a solution with an organic material such as a carbonaceous thermal decomposable material and subsequently sprayed directly into the furnace. This solution not only provides a source of flux to dissolve the scale but, in addition, produces the desirable reducing atmosphere in the furnace as the organic material is thermally decomposed therein. In this respect, if salt cake or sodium sulfate is utilized as a source of flux, this substance may be mixed with any organic material such as a carbohydrate or the like, and dissolved in water to form a solution which is sprayed into the furnace and against the refractories to be treated. The solution atomizes upon entering the furnace atmosphere and the organic constituents are decomposed resulting in the reducing atmosphere which reduces the sodium sulfate.

Sources of flux which have been found to be particularly effective and desirable for treating the refractory walls and roof of a glass making furnace are organic sodium-sulfur compounds and particularly those belonging to the general family of sodium aryl sulfate or the related sodium alkyl sulfate or sulfonate. Water solutions of these compounds may be sprayed into the furnace and at refinery conditions these compounds are decomposed by the heat into carbonaceous products and intermediate sodium-sulfur compounds. As noted above, the sodium-sulfur compounds react with and dissolve the silica scale while the carbonaceous products maintain a reducing atmosphere in the furnace in order to chemically reduce the relatively inert sodium sulfate to the more reactive intermediate sodium-sulfur compounds. Among the families of compounds which may be utilized are:

| Description | General Formula |
| --- | --- |
| Sodium alkyl sulfate | $R \cdot O \cdot SO_2 \cdot O^- \,^+Na$ |
| Sodium alkyl sulfonate | $R \cdot SO_2 \cdot O^- \,^+Na$ |
| Didsodium salt of sulfated fatty acid. | $CnH_{2n-2}(O \cdot SO_2O^- \,^+Na)CO \cdot O^- \,^+Na$ |
| Sodium fatty acid ester sulfonate. | $R \cdot CO \cdot O \cdot CH_2 \cdot CH_2 \cdot SO_2 \cdot O^- \,^+Na$ |
| Sodium fatty acid amide sulfonate. | $R \cdot CO \cdot NH - CH_2 \cdot CH_2 \cdot SO_2 \cdot O^- \,^+Na$ |
| Sodium secondary alkyl sulfate | $R\frac{1}{2}CH \cdot O \cdot SO_2 \cdot O^- \,^+Na$ |
| Sodium salt of the bisulfate of a dialkyl dicarboxylate. | $R^1 \cdot O \cdot OC \cdot CH_2$ <br> $\|$ <br> $R^1 - OOC \cdot CH \cdot O \cdot SO_2 \cdot O^- \,^+Na$ |
| Sodium aryl sulfonate | $Ar \cdot SO_2 \cdot O^- \,^+Na$ |
| Sodium salt of the sulfonic acid derivative of a dialkyl dicarboxylate. | $R^1 \cdot O \cdot OC \cdot CH_2$ <br> $\|$ <br> $R^1 \cdot O \cdot OC \cdot CH \cdot SO_2 \cdot O^- \,^+Na$ |

Legend: R represents long hydrocarbon chain of the aliphatic type: Ar represents an aryl nucleus; $R^1$ represents a primary or secondary alkyl group of the short chain type.

An organic compound which has proved particularly effective in treating refractory roof and walls of a glass furnace is a water solution of sodium lauryl sulfate. Although there are a number of commercial preparations which contain sodium lauryl sulfate, very successful results have been obtained by utilizing a commercial surface active agent tradenamed "Orvus WA" paste. "Orvus WA" paste is a thick water solution containing 40% by weight of sodium lauryl sulfate. Before being introduced into the furnace, the paste is brought to a temperature of approximately 90° F. permitting the rather thick paste to melt into a thin amber liquid which may be easily sprayed into the furnace. This surface active agent performs effectively because it contains both the sodium-sulfur fluxes and the carbonaceous reducing agents and, in addition, the characteristics of the material aid in the atomization of the solution. Moreover, the material is readily and economically available.

The organic sodium-sulfur compounds listed above contain a sufficient quantity of carbonaceous reducing agents to accommodate a quantity of sodium-sulfur compounds in excess of the amount they contain. It has been found advantageous, therefore, to add additional sodium-sulfur compounds to the solution before spraying the latter into the furnace. For example, very good results have been obtained by using "Orvus WA" and sodium sulfate in a water solution.

To better facilitate spraying the material into the furnace additional water may be added to thin out the solution. Generally stated, the spray material may consist of an organic sodium-sulfur compound of the type set forth above, sodium sulfate and water in the following proportions:

|  | Parts by wt. |
| --- | --- |
| Organic sodium sulfur compound | ½ to 100 |
| Sodium sulfate | 0 to 5 |
| Water | 0 to 12 |

For example, Orvus WA paste, sodium sulfate and water mixed together in a solution with the constituents falling within the following ranges have proven satisfactory:

|  | Parts by wt. |
| --- | --- |
| Orvus WA paste | ½ to 100 |
| Sodium sulfate | 0 to 5 |
| Water | 0 to 12 |

Excellent results have been obtained with the utilization of a solution containing Orvus WA paste, sodium sulfate and water in the following proportions:

| | Parts by wt. |
|---|---|
| Orvus WA paste | 1 |
| Sodium sulfate | 1 |
| Water | 3 |

Any suitable spraying procedure may be employed in practicing the present invention. A simple and preferred procedure is to place the spraying solution in a pressure feed tank to which are connected relatively long atomizing nozzles or lances. The lances are connected at one end to a source of high pressure air and the solution is introduced into the air stream passing through the lances from the high pressure feed tank at a point intermediate the ends of the lances whereby the lances function on the principle of an aspirator to introduce the atomized solution into the furnace at a high velocity. In place of the aspirating air, high pressure steam may be utilized and would have an advantage over the use of air in that it would have less tendency to oxidize the decomposing spray solution. Openings are provided in the furnace walls at intervals of at least every ten feet along the area to be treated which, as noted above, is usually the refining section of the furnace. The furnace pressure is increased to retard air filtration into the furnace and, therefore, prevent oxidization of the spray solution.

Valves are provided on the lances to permit adjustment to the rate of flow of the aspirating medium and thus the solution. A preferred rate of flow of the solution was found to be ½ gallon per minute. When spraying, the lances are projected through the openings in the furnace walls and manipulated in a continuous oscillatory motion so that the high velocity spray impinges directly upon the area of the refractory to be treated. The lances are moved from opening to opening and thus advanced up and down the refining section of the furnace until the scale on the entire area has been transformed into the desired glasseous coating.

The following descriptions are given as examples of the embodiments of the present invention which have proved to be successful. However, they are not to be considered to provide a limitation on the invention and equivalents are to be included with the scope of the disclosure.

*Example I*

A treating solution comprised essentially of a water solution, sodium lauryl sulfate and sodium sulfate was prepared from the following materials:

| | Parts |
|---|---|
| Orvus WA paste | 1 |
| Sodium sulfate | 1 |
| Water | 3 |

This solution was brought to a temperature of approximately 90° F. and placed in a pressure feed tank of the type manufactured by De Vilbiss, Model No. P–QM 5036. An elongated lance formed from a three-quarter inch inside diameter stainless steel pipe was coupled, through the medium of a globe valve, to a source of high pressure air. An inlet provided intermediate the ends of the lance and downstream from the globe valve was connected to an outlet coupling on the pressure feed tank. The flow of high pressure air through the pipe was adjusted so that the solution was aspirated into the air stream from the pressure feed tank at a rate of ½ gallon per minute.

The lance was projected through an opening formed in the furnace wall adjacent the area to be treated and directed toward the refractory roof and side walls of the furnace and continuously oscillated back and forth whereby the spray emitting from the lance impinges upon the entire area to be treated. The lance was moved back and forth along the furnace and projected through additional openings until the entire roof and walls of the refining section of the furnace on which the scale appeared had been exposed to the spray solution. The spraying operation was continued until all of the scale had been dissolved and transformed into a glasseous coating covering the internal walls and roof.

*Example II*

The procedure outlined in Example I was followed utilizing a spray solution comprising a combination of a sodium fatty acid ester sulfonate, specifically the oleic acid ester of sodium isethionate $$(C_{17}H_{33}\cdot CO\cdot O{-}CH_2\cdot CH_2\cdot O\cdot SO_2\cdot O^{-+}Na)$$

This compound is commercially sold under the tradename of "Igepon A" and manufactured by General Aniline and Film Corporation. "Igepon A" was combined with salt cake and water in the following proportions:

| | Parts by wt. |
|---|---|
| Igepon A | 1 |
| Sodium sulfate | 1 |
| Water | 3 |

*Example III*

The procedure outlined in Example I was followed using a fluxing agent comprising a water solution of a dioctyl ester of sodium sulfosuccinic acid $$\begin{array}{l}Na^{+-}O\cdot O_2SCH\cdot CO\cdot O\cdot C_8H_{17}\\ \quad\quad\quad\quad\;\; | \\ \quad\quad\quad\quad CH_2CO\cdot O\cdot C_8H_{17}\end{array}$$

and sodium sulfate compound. This surface active agent is sold commercially under the trade-name of Aerosol OT and is manufactured by American Cyanamid Company. Aerosol OT was combined with salt cake and water in the following proportions:

| | Parts by wt. |
|---|---|
| Aerosol OT | 1 |
| Sodium sulfate | 1 |
| Water | 3 |

It will be appreciated that in all of the examples the amount of solution and the duration of the spraying operation will depend upon the amount of scale present on the refractories. In all cases, the spraying operation is continued until all of the scale has been dissolved and transformed into a hard, dense glasseous coating which acts as a glue to cement the scale on the refractories and, in addition, protects the refractories from further attack from the alkali and sulfate fumes.

It is to be understood that the forms of the invention herewith described are to be taken as illustrative embodiments only of the same, and that various procedural changes may be resorted to without departing from the spirit of the invention.

We claim:

1. In a process for treating silica refractory forming the roof and side walls of a glass melting furnace to eliminate a crystalline scale formation thereon, the steps of, introducing a sodium-sulfur compound into the furnace and onto said refractory above the glass melt in the furnace, introducing a source of reducing gas in said furnace adjacent said refractory, and regulating the amount of said source of reducing gas being introduced into said furnace to maintain the atmosphere at reducing conditions but insufficient to reduce the glass melt.

2. A process for treating silica refractory forming the roof and side walls of a glass melting furnace to eliminate a crystalline scale formation thereon, the steps of, introducing a fluxing agent comprising an organic compound selected from the group consisting of sodium alkyl sulfates, sodium aryl sulfates and sodium aryl sulfonates into the furnace and onto said refractory above the glass melt, regulating the amount of said fluxing agent being introduced to maintain the atmosphere created thereby at reducing conditions but insufficient to reduce the glass melt.

3. A process for treating silica refractory forming the roof and side walls of a glass melting furnace to eliminate crystalline scale formation thereon, the step of introducing an organic fluxing agent into said furnace and onto said refractories to be treated, said fluxing agent comprising a compound selected from the group consisting of $$C_nH_{2n-2}(O \cdot SO_2O^{-+}Na)CO \cdot O^{-+}Na$$

$$R \cdot CO \cdot NH-CH_2 \cdot CH_2 \cdot SO_2 \cdot O^{-+}Na$$

$$R\tfrac{1}{2}CH \cdot O \cdot SO_2 \cdot O^{-+}Na$$

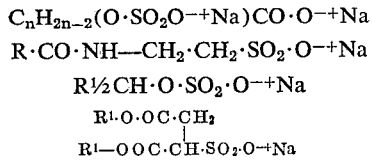

and

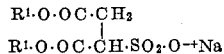

wherein R is a long hydrocarbon chain of the aliphatic type; Ar is an aryl nucleus; and $R^1$ is a hydrocarbon selected from the group consisting of primary and secondary alkyl groups of the short chain type, and regulating the amount of said fluxing agent being introduced into said furnace to maintain the reducing atmosphere created thereby at reducing conditions but insufficient to reduce the glass melt in said furnace.

4. A process for treating silica refractory as defined in claim 1, in which said sodium-sulfur compound is sodium sulfate.

5. A process for treating silica refractory as defined in claim 1, in which said reducing atmosphere is maintained by introducing a source of reducing gas into the furnace above the glass melt.

6. A process for treating silica refractory as defined in claim 1, in which an atomized water solution of said fluxing agent is sprayed into said furnace directly against said refractories to be treated.

7. A process for treating silica refractory as defined in claim 1, in which said fluxing agent comprises sodium lauryl sulfate.

8. A process for treating silica refractory as defined in claim 1, in which said fluxing agent consists of the oleic acid ester of sodium isethionate.

9. A process for treating silica refractory as defined in claim 1, in which said fluxing agent consists of the dioctyl ester of sodium sulfosuccinic acid.

10. A process for treating silica refractory forming the roof and side walls of a glass melting furnace to eliminate a crystalline scale formation thereon, the steps of spraying the refractory roof and walls to be treated with a fluxing solution comprising 0 to 12 parts by weight of water, 0 to 5 parts by weight of sodium sulfate, and ½ to 100 parts by weight of a compound selected from the group consisting of sodium lauryl sulfate, oleic acid ester of sodium isethionate and dioctyl ester of sodium sulfosuccinic acid, and regulating the amount of fluxing solution being sprayed into said furnace and onto said refractory to maintain the reducing atmosphere created thereby at reducing conditions but insufficient to reduce the glass melt in said furnace.

11. A process for treating silica refractory forming the roof and side walls of a glass melting furnace to eliminate a crystalline scale formation thereon, the step of spraying the refractory roof and walls to be treated with a fluxing solution consisting essentially of 1 part by weight of sodium lauryl sulfate, 1 part by weight of sodium sulfate, and 3 parts by weight of water, and regulating the amount of fluxing solution being sprayed into said furnace and onto said refractory to maintain the reducing atmosphere created thereby at reducing conditions but insufficient to reduce the glass melt in said furnace.

12. A process for treating silica refractory forming the roof and side walls of a glass melting furnace to eliminate a crystalline scale formation thereon, the step of spraying the refractory roof and walls to be treated with a fluxing solution consisting essentially of 1 part by weight of dioctyl ester of sodium sulfosuccinic acid, 1 part by weight of sodium sulfate and 3 parts by weight of water, and regulating the amount of fluxing solution being sprayed into said furnace and onto said refractory to maintain the reducing atmosphere created thereby at reducing conditions but insufficient to reduce the glass melt in said furnace.

13. A process for treating silica refractory forming the roof and side walls of a glass melting furnace to eliminate a crystalline scale formation thereon, the step of spraying the refractory roof and walls to be treated with a fluxing solution consisting essentially of 1 part by weight of dioctyl ester of sodium sulfosuccinic acid, 1 part by weight of sodium sulfate and 3 parts by weight of water, and regulating the amount of fluxing solution being sprayed into said furnace and onto said refractory to maintain the reducing atmosphere created thereby at reducing conditions but insufficient to reduce the glass melt in said furnace.

References Cited by the Examiner

UNITED STATES PATENTS

| | | | |
|---|---|---|---|
| 2,198,745 | 4/1940 | Smith | 65—27 |
| 2,508,629 | 5/1950 | Tanberg | 65—27 |

FOREIGN PATENTS 751,717  7/1956  Great Britain.

DONALL H. SYLVESTER, *Primary Examiner.*